United States Patent Office 3,542,866
Patented Nov. 24, 1970

3,542,866
C-AMINODODECAHYDROMONOCARBA-UNDECARBORATES
Walter H. Knoth, Jr., Mendenhall, Pa., assignor to E. I. du Pont de Nemours and Company, Wilmington, Del., a corporation of Delaware
No Drawing. Continuation-in-part of application Ser. No. 463,340, June 11, 1965. This application Mar. 3, 1969, Ser. No. 803,972
Int. Cl. C07c *103/30*
U.S. Cl. 260—558
10 Claims

ABSTRACT OF THE DISCLOSURE

C-aminododecahydromonocarbaundecaborates (1-) can prepared by the hydrolysis of $B_{10}H_{12}CN \cdot SR_2^-$ anions preferably in the presence of an acid as a catalyst, to give the compound $NH_3CB_{10}H_{11}OH$ which can then be substituted at the amino nitrogen with hydrocarbyl groups by hydrocarbylating agents conventional in organic chemistry. An amino hydrogen of the amino compounds can be replaced with non-oxidizing cations capable of forming strong bases. Addition of an acyl halide to $$B_{10}H_{12}CN \cdot SR_2^-$$

gives an N-acyl C-aminododecahydromonocarbaundecaborate substituted with $SR_2$, which on heating above 150° C. loses $SR_2$ to form a compound in which the nitrogen is bonded to the carbon and a boron atom of the monocarboundecaborate cage. The compounds are useful as reducing agents for the preparation of printed circuits, and for the manufacture of resistors.

RELATED APPLICATIONS

This application is a continuation-in-part of my application S. N. 463,340 filed June 11, 1965, now abandoned.

FIELD OF THE INVENTION

This invention relates to novel boron-containing compositions and to processes for their preparation. More particularly, it relates to C-aminododecahydromonocarbaundecaborates(1-) and certain substituted derivatives thereof, and their preparation.

SUMMARY OF THE INVENTION

The compounds of the present invention have the formulae (1) $RR'R''NCB_{10}H_{11}OH$

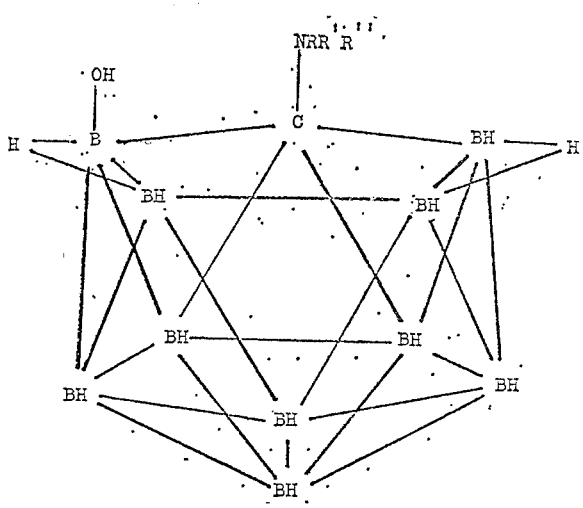

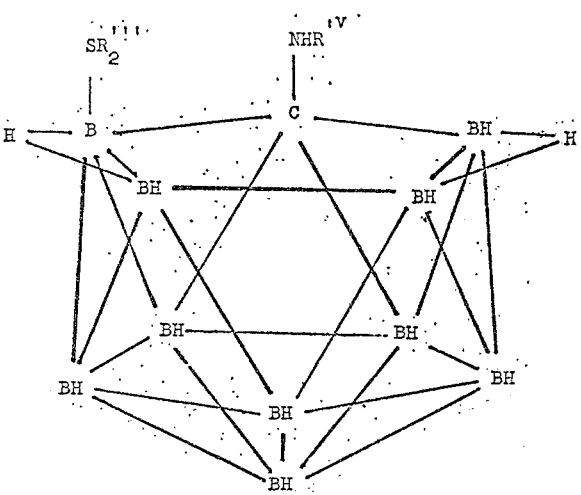

(2) $R'^vNHCB_{10}H_{11}SR_2'''$

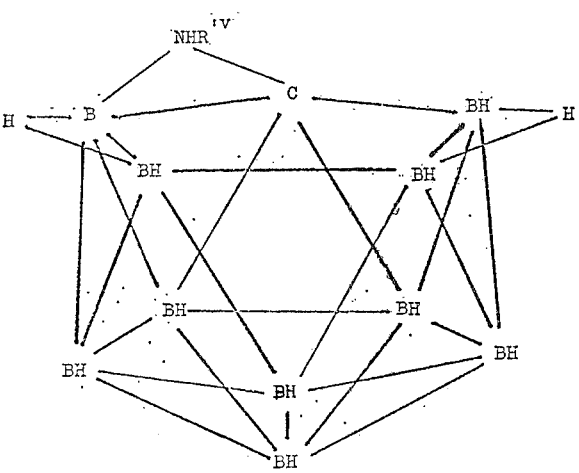

(3) $R'^v\overline{NHCB_{10}H_{11}}$

In the above formulae, R and R' are hydrogen or alkyl of up to 18 carbon atoms; R'' is hydrogen, alkyl of up to 18 carbon atoms or one equivalent of a cation selected from the class consisting of alkali metals, alkaline earth metals and $G_4N^+$ wherein G is lower alkyl group, with the proviso that when any one of R, R' and R'' is an alkyl bonded to nitrogen through carbon, that carbon bears at least one hydrogen atom.

R''' separately is an alkyl group of up to 12 carbon atoms, and R'$^v$ is acetyl or benzoyl.

The compounds of the invention can be prepared, generally, as described by the following equations:

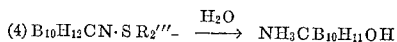
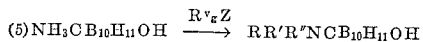
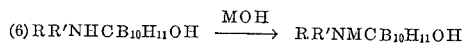
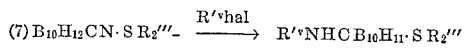
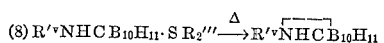

In Equation 5, $R^v_gZ$ is a hydrocarbylating agent.

DETAILED DESCRIPTION OF THE INVENTION

In the process represented by Equation 4, the compound of Formula 1 is produced wherein R, R' and R" are hydrogen. The anion $B_{10}H_{12}CN \cdot SR_2'''^-$ is used in its salt form, and any salt can be employed. However, for convenience and availability, the alkali metal or alkaline-earth metal salts are preferred. The salt is reacted with water, either alone or, preferably in an acidic environment. The latter embodiment is preferred because the acid increases the rate of the reaction appreciably. In the absence of an acid environment, the reaction can be conducted at a temperature between about 60° C. and the decomposition point of the product. An especially convenient, and therefore preferred, temperature is the reflux temperature of the reaction mixture, i.e., about 100° C. Adequate conversions are realized in about 8–24 hours, although the process can be run longer if desired. In the preferred embodiment, an aqueous solution of the salt is simply reacted with an acidic environment, which can be an acidic ion-exchange resin, e.g., "Amberlite" IR120(H), or can be an aqueous solution of a nonoxidizing acid present in concentrations of less than 2 molar. Such acids include hydrochloric, hydrobromic, hydroiodic or dilute nitric or sulfuric. Preferably, the acid concentration will be between 0.01 and 1.5 molar. The product may be isolated from the effluent or solution simply by adding a precipitating solvent such as dioxane, whereby the solvated product crystallizes. Such solvates comprise a part of this invention. Upon heating, the solvent of crystallization is driven off. With the cation-exchange resin, the effluent may simply be evaporated to isolate the product.

The $B_{10}H_{12}CN \cdot SR_2'''^-$ salts used in this process, and also in the process represented by Equation 7, can be prepared as described in J. Inorg. Nucl. Chem., 20, 66 (1961). For example, the sodium salts can be prepared by reacting decaborane with anhydrous sodium cyanide and a dialkyl sulfide ($SR_2'''$) at autogenous pressure in a vacuum train or in situ directly in the reactions of Equations 4 and 7. R''' as used herein represents an alkyl radical of up to 12 carbon atoms. R''' is exemplified by methyl, ethyl, tertiary butyl, octyl and the like.

Equation 5 shows the alkylating process to obtain other compounds of Formula 1. The alkylating agent, $R^v{}_gZ$ is the means through which the organic groups defined in R, R' and R" are placed in the compounds of Formula 1. Thus $R^v$ represents the alkyl, of R, R' and R". Z represents the leaving group of valence $g$. The term "leaving group" is used as described in Gould "Mechanism and Structure in Organic Chemistry" (Holt-Dryden, 1959), p. 261. Preferably Z is halogen (chloride, bromide or iodide), sulfate, or a $C_1$–$C_7$ hydrocarbonsulfonate free of aliphatic unsaturation.

The alkyl groups defined in R, R', R" and $R^v$ are not critical in the carbon content; although for convenience a carbon limit of up to 18 carbons is preferred, and most preferably, of up to 12 carbon atoms. Examples of alkyl groups include methyl, ethyl, isooctyl, isopropyl, 2-ethylhexyl, 1-methylnonyl, dodecyl, octadecyl, and the like.

The hydrocarbylation reaction with $R^v{}_gZ$ is carried out in basic solution at room temperatures and pressures; however, temperature and pressure are not critical and other such conditions may be employed. In general, this process is similar to the process for hydrocarbylating an organic amine.

In the process represented by Equation 6, one amino hydrogen is replaced by a cation. Equation 6 is illustrative only, for a cation can replace the hydrogen in, for example, $NH_3CB_{10}H_{11}OH$. This reaction is carried out in the presence of a strong base, and preferably the cation is added in its hydroxide form. By adding one equivalent of the hydroxide MOH, the resulting salt of this invention can be obtained by evaporation of the solvent.

Alternatively, the cation can be added to a basic solution of the amino-$CB_{10}$ compound in its salt form, preferably the halide form. M in these reactions and in the formulas representing compounds of the invention can be an alkali metal, alkaline earth metal or $G_4N^+$ wherein G is a lower alkyl group (1–8 carbon atoms) pentylammonium and the like.

In the process represented by Equation 7, the aforedescribed salts of $B_{10}H_{12}CN \cdot SR_2'''^-$ are treated with an acyl halide of the formula $R'^v$ hal wherein $R'^v$ is the acyl group and hal represents the halogen (chlorine, bromine or iodine). A solvent is not necessary; however, if one is desired, primarily to slow the reaction, an aromatic or saturated aliphatic hydrocarbon may be used. The reaction takes place simply by mixing the reactants, thus time temperature and pressure are not critical. Preferably, the reaction temperature is kept below 60° C. by cooling or slow mixing.

In the process represented by Equation 8 the product of the process of Equation 7 is simply heated at a temperature between 150° C. and the decomposition point of the reactant. Neither pressure nor time is critical; however, it is advantageous to carry out the reaction under reduced pressure to aid in removal of the hydrocarbyl sulfide eliminated in the reaction.

In the foregoing descriptions, and as shown in the examples which follow, the compounds of the invention frequently contain molecules of solvation, e.g., water or dioxane. The solvating molecules can be removed by heating in vacuo, e.g., at 20–135° C., but the solvates are to be considered as a part of this invention.

In general the compounds of the invention are white, crystalline, high-melting solids which are stable to air, moisture and dilute acids and bases.

The products and processes of this invention are illustrated in further detail in the following examples.

EXAMPLE 1

An aqueous solution of $CsB_{10}H_{12}CN \cdot S(CH_3)_2$ (22.3 g.) was passed through an ion-exchange column filled with a commercial, sulfonic-acid-type, cation-exchange resin ["Amberlite" IR120(H)]. The effluent solution was evaporated to dryness on a steam bath to give a mixture containing $NH_3CB_{10}H_{11}OH$. Extraction of this mixture with ethyl ether followed by filtration and evaporation of the extract gave $NH_3CB_{10}H_{11}OH$. This was dissolved in a small amount of water. The addition of dioxane precipitated a crystalline dioxanate,

$$NH_3CB_{10}H_{11}OH \cdot C_4H_8O_2$$

which was recrystallized from water.

*Analysis.*—Calc'd for $C_5H_{23}B_{10}NO_3$ (percent): C, 42.7; C, 23.7; H, 9.1. Found (percent): C, 41.8; C, 24.7; H, 9.4.

The infrared spectrum of $NH_3CB_{10}H_{11}OH \cdot C_4H_8O_2$ confirms the presence of O–H and N–H bonds

EXAMPLE 2

An aqueous solution of $CsB_{10}H_{12}CN \cdot S(CH_3)_2$ (12.6 g.) was passed through an ion-exchange column filled with "Amberlite" IR120(H) resin. The effluent solution was evaporated to dryness on a steam bath. The residual solid containing $NH_3CB_{10}H_{11}OH$ was extracted with 60 ml. of water and the extract was filtered. The filtrate was divided into two equal portions. Each portion was reacted with stirring with 20 ml. of 10% aqueous sodium hydroxide and 1.5 ml. of dimethyl sulfate followed by an additional 10 ml. of 10% aqueous sodium hydroxide and 1.5 ml. of dimethyl sulfate. A precipitate of

$$(CH_3)_3NCB_{10}H_{11}OH$$

was obtained from each half and was recrystallized from aqueous acetonitrile. The combined yield of recrystallized $(CH_3)_3NCB_{10}H_{11}OH$ was 2.7 g. (35%). The product appeared to decompose at about 320° but did not melt to 400°.

*Analysis.*—Calc'd for $C_4H_{21}B_{10}NO$ (percent): B, 52.2; C, 23.2; H, 10.1; N, 6.8. Found (percent): B, 52.2; C, 23.5; H, 10.4; N, 6.6.

The infrared spectrum of $(CH_3)_3NCB_{10}H_{11}OH$ in a potassium bromide wafer includes characterizing absorptions in microns at 2.77(m), 2.80(m), 3.25(w), 3.95(s), 6.73(m), 6.85(m), 7.1(w), 8.4(m), 8.85(m), 8.95(m), 9.35(m), 9.75(m), 10.25(m), 10.65(m), 11.4(w), 11.8(w), 12.05(w), 12.4(w), 12.6(m), 13.1(w), 14.0(w), and 15.2(w).

A solution of $(CH_3)_3NCB_{10}H_{11}OH$ in aqueous tetrahydrofuran was basified with aqueous sodium hydroxide and allowed to set for about 32 hours. Dilution of the solution with water precipitated $(CH_3)_3NCB_9H_{11}$, M.P. 265–270°.

EXAMPLE 3

The dioxanate of $NH_3CB_{10}N_{11}OH$ was dissolved in dilute aqueous sodium hydroxide at room temperature to give a solution containing $NaNH_2CB_{10}H_{11}OH$. The solution was divided into two parts. One part was acidified immediately with hydrochloric acid, whereupon the dioxanate of $NH_3CB_{10}H_{11}OH$ reprecipitated slowly in crystalline form. The other portion was immediately mixed with an aqueous solution of tetramethylammonium chloride, whereupon $(CH_3)_4NNH_2CB_{10}H_{11}OH$ precipitated as a solid. The infrared absorption spectra of the two solids precipitated from the alkaline solution were in accord with the above structures.

EXAMPLE 4

$NaB_{10}H_{12}CN \cdot S(CH_3)_2$ (15 g.) was added slowly to benzoyl chloride (100 ml.) with stirring. The mixture was stirred 10 minutes and filtered. The filtrate was diluted with a large amount of petroleum ether to precipitate 7.5 g. of crude $C_6H_5CONHCB_{10}H_{11}S(CH_3)_2$. The solid from the filtration of the reaction mixture was extracted with six 100-ml. portions of hot ethyl acetate. These extracts were concentrated to obtain an additional 1.6 g. of product for a total yield of 52.5%. The analytical sample was obtained by dissolving 1.6 g. of the crude product in 50 ml. of acetonitrile with boiling as needed. This solution was filtered and water was added to the filtrate until it was cloudy. Crystals (1.2 g.) of pure $$C_6H_5CONHCB_{10}H_{11}S(CH_3)_2$$

then formed in a few minutes. These were separated and dried in vacuo at 80° (dec. pt. 151–152°).

*Analysis.*—Calc'd for $C_{10}H_{23}B_{10}NO_3S$ (percent): B, 34.5; C, 38.4; H, 7.4; N, 4.5; S, 10.2. Found (percent): B, 34.7; C, 38.3; H, 7.6; N, 4.8; S, 10.2.

The proton-magnetic-resonance spectrum of the product showed the presence of the $C_6H_5$ group and of the two methyl groups attached to sulfur, and the absence of any other hydrogen bonded to carbon.

EXAMPLE 5

$NaO_{10}H_{12}CN \cdot S(CH_3)_2$ (0.41 g.) was added to acetyl chloride (20 ml.) with stirring. After one minute the mixture was filtered. The filtrate was evaporated. The residue was dissolved in 1,2-dimethoxyethane and the solution was added to petroleum ether with stirring to precipitate 0.18 g. of $CH_3CONHCB_{10}H_{11}S(CH_3)_2$, dec. pt. 120–130°.

*Analysis.*—Calc'd for $C_5H_{21}B_{10}NOS$ (percent): C, 23.8; H, 8.4; S, 12.7; Mol. Wt., 251. Found (percent): C, 22.9; H, 8.7; S, 10.1; Mol. Wt., 246.

EXAMPLE 6

$C_6H_5CONHCB_{10}H_{11}S(CH_3)_2$ (3.25 g.) was heated at 160–165° C. and 0.1 mm. for 3 days. Methyl sulfide was thus completely removed, and there remained

as a crystalline solid having a decomposition point of 200–202° C.

*Analysis.*—Calc'd for $C_8H_{17}B_{10}NO$ (percent): C, 38.2; H, 6.8; B, 43.0; N, 5.6. Found (percent): C, 38.2; H, 7.2; B, 43.4; N, 5.4.

The ultraviolet absorption spectrum of the product in acetonitrile showed maxima at $238\mu$ ($\epsilon=14{,}200$) and $245\mu$ ($\epsilon=9250$). The product was insoluble in water and soluble in aqueous sodium hydroxide, acetonitrile and benzene.

EXAMPLE 7

A mixture of 5 g. of $NaB_{10}H_{12}CN \cdot S(CH_3)_2$ and 40 ml. of water was refluxed for 16 hours and cooled. The resulting solution of $NaNH_2CB_{10}H_{11}OH$ was stirred with 10 ml. of aqueous 10% sodium hydroxide and 2 ml. of dimethyl sulfate, whereupon crude $(CH_3)_3NCB_{10}H_{11}OH$ precipitated as a solid. The product was purified by extracting impurities with boiling water. After drying, the pure product weighed 0.7 g. It was identified by comparison of its infrared absorption spectrum with that of an authentic sample.

The foregoing examples are merely illustrative, any of the reagents and boron reactants described previously can be treated in the manner shown in the examples to obtain the novel products of this invention.

The compounds of this invention are useful as reducing agents in the preparation of printed electrical circuitry as follows. On a clean surface (such as paper) a circuit is traced using a solution of the boron compound in a solvent such as acetonitrile. After the solvent has evaporated the tracings are sprayed with an aqueous solution of palladium chloride. As the palladium is reduced, a black outline appears. The unreduced metal is rinsed away leaving a metallic tracing. The compounds of the invention can also be used to reduce silver nitrate to metallic silver. They can be used to prepare electrical resistors as follows: A cotton string is impregnated with a nearly saturated solution of a compound of the invention in a volatile solvent. The string is removed from the solution and allowed to dry. A free flame is applied to the dried string and it burns to yield a coherent ash which in size and shape resembles the original string. The residual skeleton is of sufficient coherence to permit embedding in paraffin and is a useful electrical resistor. Resistors of 4200 to 1,200,000 ohms/mm. have been prepared in this fashion. Similar burning of an untreated string leaves a small residue which cannot be handled.

What is claimed is:
1. A boron containing compound selected from the class consisting of

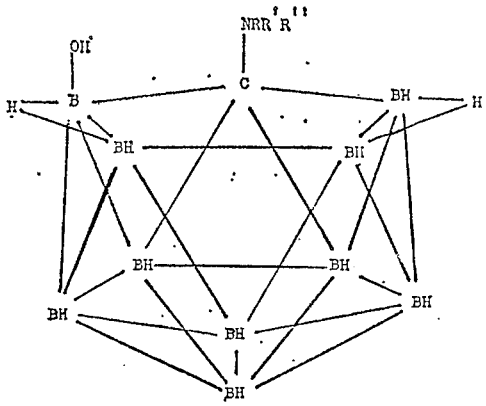

3,542,866

7

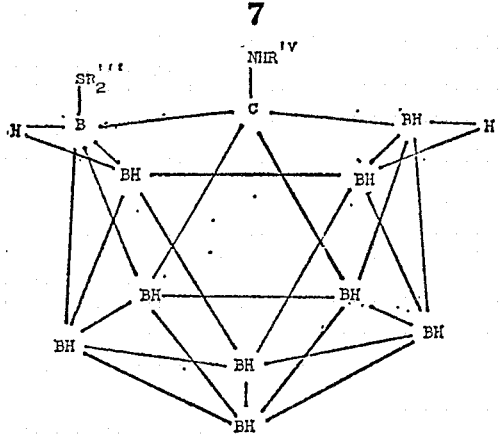

and

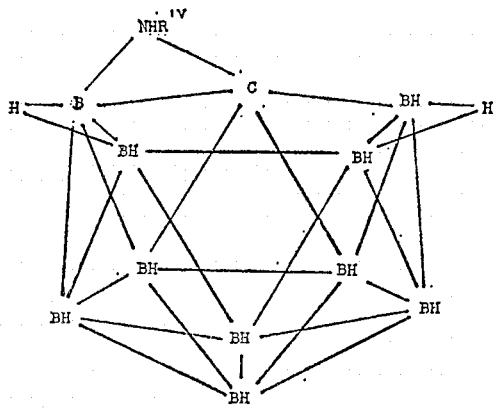

wherein R and R' are selected from the class consisting of hydrogen and alkyl of up to 18 carbon atoms;

R" is selected from the class consisting of hydrogen, alkyl of up to 18 carbon atoms and one equivalent of a cation selected from the class consisting of alkali metal, alkaline earth metal, and $G_4N^+$ wherein G is a lower alkyl group; with the proviso that when any one of said R, R' and R" is an alkyl group bonded to the nitrogen atom through carbon, said carbon bears at least one hydrogen atom;

R'" separately is an alkyl group of up to 12 carbon atoms; and,

R'$^v$ is acetyl or benzoyl.

2. A boron-containing compound having the formula:

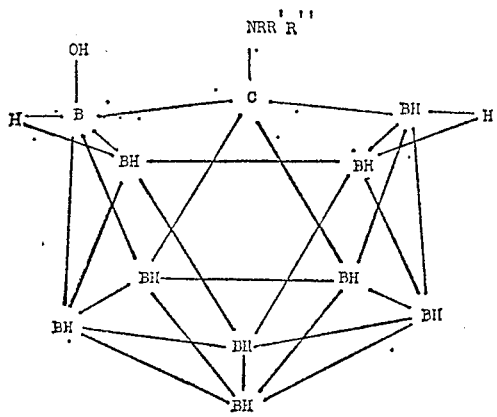

wherein R and R' are selected from the class consisting of hydrogen and alkyl of up to 18 carbon atoms; and R" is selected from the class consisting of hydrogen, alkyl of up to 18 carbon atoms and one equivalent of a cation selected from the class consisting of alkali metal, alkaline earth metal and $G_4N^+$ wherein G is

8 a lower alkyl group; with the proviso that when any one of R, R' and R" is an alkyl bonded to the nitrogen through a carbon, said carbon bears at least one hydrogen atom.

3. Compound of claim 2 wherein R, R' and R" are each hydrogen.

4. Compound of claim 2 wherein R, R' and R" are each methyl.

5. Compound of claim 2 wherein R and R' are each hydrogen and R" is $(CH_3)_4N^+$.

6. A boron containing compound having the formula

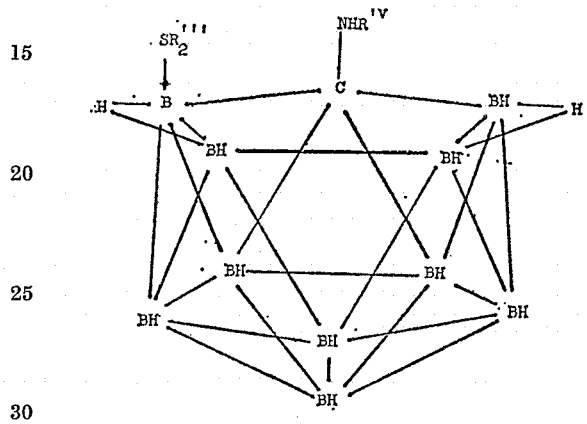

wherein R'" separately is an alkyl group of up to 12 carbon atoms; and

R'$^v$ is acetyl or benzoyl.

7. Composition of claim 6 wherein each R'" group is methyl and R'$^v$ is benzoyl.

8. Composition of claim 6 wherein each R'" group is methyl and R'$^v$ is acetyl.

9. A boron containing compound having the formula

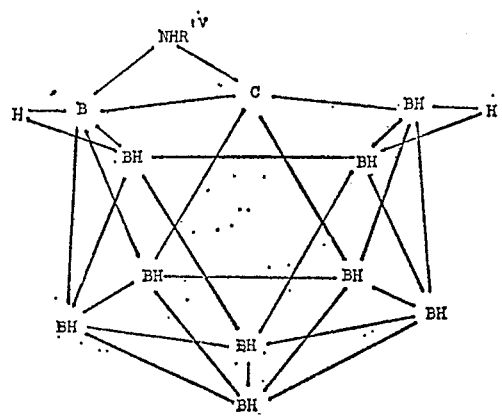

wherein R'$^v$ is acetyl or benzoyl.

10. Composition of claim 9 wherein R'$^v$ is benzoyl.

References Cited

UNITED STATES PATENTS 3,334,136    8/1967    Huoth et al. _____ 260—534
3,121,091    2/1964    Green _____ 260—309

JOHN D. RANDOLPH, Primary Examiner

H. I. MOATZ, Assistant Examiner

U.S. Cl. X.R.

252—188, 500, 518, 521; 260—464, 561, 563, 583, 567.6

PO-1050
(5/69)

UNITED STATES PATENT OFFICE
CERTIFICATE OF CORRECTION

Patent No. 3,542,866      Dated November 24, 1970

Inventor(s) WALTER H. KNOTH, JR.

It is certified that error appears in the above-identified patent and that said Letters Patent are hereby corrected as shown below:

Column 1, line 15, "...borates (1-)" should read -- ...Borates(1-) --.

Column 4, line 5, between "atoms)." and "pentylam-" insert -- Examples of the above cations include sodium, potassium, cesium, calcium, barium, magnesium, tetraisopentyl-ammonium, --.

Column 5, line 60, "$NaO_{10}$..." should read -- $NaB_{10}$... --.

SIGNED AND
SEALED
MAR 9 1971

(SEAL)
Attest:

Edward M. Fletcher, Jr.
Attesting Officer

WILLIAM E. SCHUYLER, JR
Commissioner of Patents